July 16, 1929.   G. A. GALLOWITZ   1,720,830
STERILIZING GAUGE GLASS FOR STERILIZERS OR THE LIKE
Filed Nov. 7, 1927
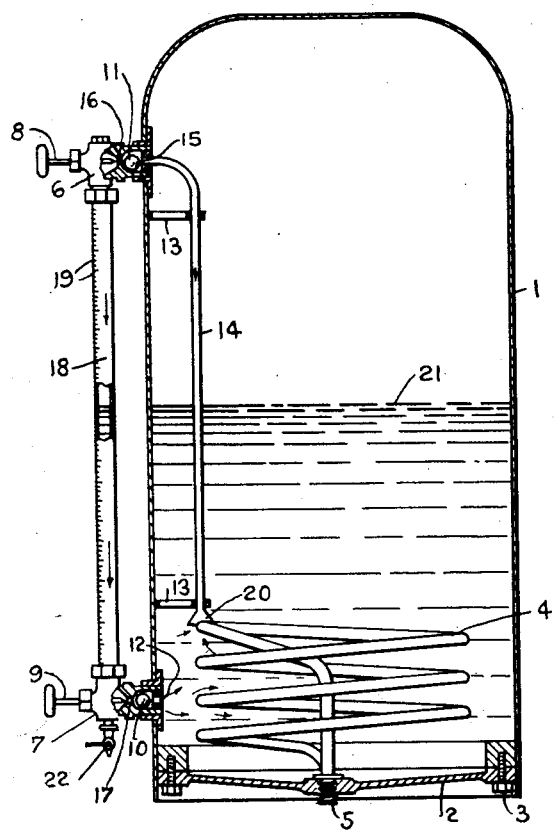
Inventor
Gustave A. Gallowitz
By his Attorney
Clarence G. Campbell Patented July 16, 1929.

1,720,830

UNITED STATES PATENT OFFICE.

GUSTAVE A. GALLOWITZ, OF NEW YORK, N. Y., ASSIGNOR TO THE KNY-SCHEERER CORPORATION OF AMERICA, OF NEW YORK, N. Y., A CORPORATION OF NEW YORK.

STERILIZING GAUGE GLASS FOR STERILIZERS OR THE LIKE.

Application filed November 7, 1927. Serial No. 231,696.

My invention relates to an improvement in a sterilizing gauge glass for sterilizers or the like and the novelty consists in the adaptation and arrangement of parts as will be more fully hereinafter pointed out.

In the sterilizing of water or other solutions it has been necessary heretofore to pass live steam through the gauge glass of the sterilizer in order to sterilize the same as the water or solution being sterilized enters the gauge glass and would be thereby fertilized unless the gauge glass is sterile. This operation is very hazardous as frequently the gauge glass is at a substantially low temperature and passing steam therethrough often breaks the glass. Furthermore, the use of steam is not always a perfect sterilizer and this method is therefore most inefficient as well as hazardous.

My device solves this problem and insures perfect sterilization of the gauge glass in a gradual and normal way during the sterilization of the water or solution being sterilized so that perfect sterilization of the gauge glass is insured throughout the sterilization process and the danger of breaking the gauge glass and causing a serious injury to the operator eliminated.

The drawing is a vertical cross section of a sterilizer of usual construction and parts of the connections are broken away in order to show the operative parts.

In the drawing 1 is the body of my sterilizer. 2 is the bottom of the same which is rigidly secured in position by means of nuts at 3. A heating element 4 of usual construction operated by electricity, gas or oil is connected through the bottom by a tube 5 to the source of heat which is not shown. Valve fittings or connections 6 and 7 are connected to the body 1 in the usual manner and valves 8 and 9 of usual construction are respectively mounted therein. Ball members 10 and 11 are also mounted in the fittings 7 and 6 respectively and are only adapted to operate to close openings 17 and 16 respectively if the gauge glass 18, mounted in the usual manner in the fittings 6 and 7 is broken during the sterilization process, when the balls 10 and 11 will be thrown outwardly by the pressure caused through breaking the equalization of the pressure in the sterilizer because of the breaking of the gauge glass 18.

Brackets 13 are rigidly secured to the inside of the body 1 and in these brackets 13 is securely mounted a pipe 14 having a funnel 20 at its lower end immediately adjacent to the heating element 4 and connecting directly to an opening 15 at its upper end leading into an opening 16 of the fitting or connection 6. An opening 12 connects with the opening 17 of the fitting or connection 7 at the lower end of the gauge glass 18. The gauge glass 18 has the usual calibrations 19 to permit of the correct reading of the liquid level therein and 21 indicates the level of the liquid in the body 1. A drain valve 22 of usual construction is mounted in the fitting or connection 7.

In operating my device the water or solution is placed in the body 1 which is herein shown at the level 21 and this liquid will also seek the same level in the gauge glass 18 as indicated. As the heat is applied to the heating element 4 the temperature of the liquid in the funnel 20 and there-around will heat up first before the rest of the liquid is heated and as this liquid in the funnel 20 is so heated the liquid in the funnel 20 and in the pipe 14 will thereby gradually be driven upwardly because of the heat and steam formed therein so that portions of the liquid will be continuously driven through the pipe 14, the openings 15 and 16 into the upper end of the gauge glass 18 and will run down therein thereby raising the level of the liquid in the gauge glass 18 temporarily. This level, however, will be constantly corrected by the liquid seeking its proper level in relation to the level 21 so that the liquid passing down from the upper end of the gauge glass 18 will gradually pass on down through the connection or fitting 7, thence through the opening 17 and opening 12 into the bottom of the sterilizer body 1 and will gradually work up to the funnel 10 and be passed through the pipe 14 and around through the gauge glass 18 as described thereby causing the slow trickling of the liquid being sterilized in the body 1 down through the gauge glass 18 whereby the gauge glass 18 will be sterilized during the sterilization of the liquid in the sterilizer body 1 at the same time together with the main portion of liquid in the body 1 and insuring perfect sterilization of all of the liquid which may be in the gauge glass 18.

The gauge glass 18 will not be readily broken because of the gradual heating and gradual sterilization of the gauge glass 18 during the sterilization of the liquid in the main body 1 of the sterilizer, but if the gauge glass 18 is broken then the balls 10 and 11 will both be immediately pressed outwardly by the unequal pressure caused in the sterilizer body 1 through the breaking of the gauge glass 18 whereby the openings 17 and 16 will be respectively closed thereby. The operator can then shut the valves 8 and 9 in the usual well known manner and mount a new gauge glass 18 without any danger of being injured because of the breaking of the gauge glass 18.

A drain valve 22 is mounted in the base of the fitting or connection 7 so that all of the liquid may be drained from the gauge glass 18 and the connections 6 and 7 when the liquid is drained from the sterilizer body 1 through the regular connections which are not shown herein.

Many variations may be made in the specific construction of my device without departing from the spirit and intent of the invention.

I claim:

1. In a sterilizer the combination of a heating element mounted therein in the base, upper and lower valves and connections mounted in the side of said sterilizer, a gauge glass mounted in said valves and connections and a water feed pipe having a funnel at its lower end immediately adjacent said heating element and having its upper end connected to said upper valve and connection.

2. In a sterilizer the combination of a heating element mounted therein near the base, upper and lower valves and connections mounted in the side of said sterilizer, a gauge glass mounted in said valves and connections and means for insuring a continuous circulation of said sterilizing solution through said gauge glass throughout the sterilizing operation.

3. In a sterilizer the combination of a heating element mounted therein, a gauge glass mounted on the side of the same and connected therewith at each end thereof and means for insuring a continuous circulation through said gauge glass of the liquid being sterilized throughout the sterilizing period.

4. In a sterilizer the combination of a heating element mounted therein in the base, upper and lower automatic closing valves and connections mounted in the side of said sterilizer, a gauge glass mounted in said valves and connections and a water feed pipe having a funnel at its lower end immediately adjacent said heating element and having its upper end connected to said upper valve and connection.

5. In a sterilizer the combination of a heating element mounted therein near the base, upper and lower ball valves and connections mounted in the side of said sterilizer, a gauge glass mounted in said valves and connections and means for insuring a continuous circulation of said sterilizing solution through said gauge glass throughout the sterilizing operation.

6. In a sterilizer the combination of a heating element mounted therein, a gauge glass mounted on the side of the same and connected therewith at each end thereof through automatic seating valves and connections and means for insuring a continuous circulation through said gauge glass of the liquid being sterilized throughout the sterilizing period.

7. In a sterilizer the combination of a body, a heating element mounted therein, an upper and lower valve connection mounted in the side of said body, a ball mounted in each of said connections, a gauge glass mounted in said connections and means for insuring a continuous flow of the liquid being sterilized through said gauge glass during sterilization.

8. In a sterilizer the combination of a body, a heating element mounted therein, an upper and lower valve connection mounted in the side of said body, a ball mounted in each of said connections, a gauge glass mounted in said connections and means for insuring a continuous flow of the liquid being sterilized through said gauge glass during sterilization comprising a feed pipe having a funnel at its lower end immediately adjacent said heating element and having its upper end connected to said upper valve connection.

In testimony whereof I affix my signature.

GUSTAVE A. GALLOWITZ.